(12) United States Patent
Bjorken et al.

(10) Patent No.: US 8,140,105 B2
(45) Date of Patent: Mar. 20, 2012

(54) METHOD FOR CONTROLLING OUTPUT POWER IN A RADIO COMMUNICATIONS NETWORK

(75) Inventors: Peter Bjorken, Solna (SE); Lars Klockar, Solna (SE); Krister Sundberg, Sollentuna (SE)

(73) Assignee: Telefonaktiebolaget L M Ericsson (publ) (SE)

(*) Notice: Subject to any disclaimer, the term of this patent is extended or adjusted under 35 U.S.C. 154(b) by 340 days.

(21) Appl. No.: 12/532,787

(22) PCT Filed: Mar. 26, 2007

(86) PCT No.: PCT/SE2007/050184
§ 371 (c)(1),
(2), (4) Date: Sep. 23, 2009

(87) PCT Pub. No.: WO2008/118051
PCT Pub. Date: Oct. 2, 2008

(65) Prior Publication Data
US 2010/0120464 A1 May 13, 2010

(51) Int. Cl.
*H04B 17/00* (2006.01)
(52) U.S. Cl. .... 455/522; 455/69; 455/67.13; 455/67.11; 455/115.1; 370/332; 375/295
(58) Field of Classification Search ............ 455/69, 455/522, 67.13, 453, 9, 10, 504, 67.11, 67.16, 455/115.1, 115.3, 115.4, 114.2, 102, 135, 455/138, 226.3, 447, 422, 562.1, 450; 375/260, 375/242, 295, 340; 370/329, 431, 252, 331, 370/332, 333
See application file for complete search history.

(56) References Cited

U.S. PATENT DOCUMENTS

| | | | |
|---|---|---|---|
| 7,535,874 B2* | 5/2009 | Ozluturk et al. | 370/335 |
| 2002/0061073 A1* | 5/2002 | Huang et al. | 375/295 |
| 2006/0120473 A1* | 6/2006 | Baum | 375/260 |
| 2006/0165008 A1* | 7/2006 | Li et al. | 370/252 |
| 2006/0223445 A1* | 10/2006 | Baker et al. | 455/69 |
| 2008/0188260 A1* | 8/2008 | Xiao et al. | 455/522 |
| 2008/0207135 A1* | 8/2008 | Varadarajan et al. | 455/69 |
| 2009/0257393 A1* | 10/2009 | Li et al. | 370/329 |

OTHER PUBLICATIONS

International Search Report dated Jan. 30, 2008 (3 pages).
Written Opinion dated Jan. 30, 2008 (9 pages).
3GPP TS 44.060 V7.7.0 (Dec. 2006) "Radio Link Control/Medium Access Control (RLC/MAC) protocol", p. 89.
X. Xia et al., "Cross-Layer Design for Mobile Ad Hoc Networks: Energy, Throughput and Delay-Aware Approach", Wireless Communications and Networking Conference, 2006, WCNC 2006, IEEE, vol. 2, pp. 770-775.

* cited by examiner

*Primary Examiner* — Tan Trinh
(74) *Attorney, Agent, or Firm* — Myers Bigel Sibley & Sajovec, P.A.

(57) ABSTRACT

The present invention presents a method for controlling output power and reducing interference in a radio communications network wherein data transmitted over a radio interface is coded and transmitted in radio blocks. The data passes a buffer of a node before transmission. The method is characterized by a step of determining a recommended Modulation and Coding Scheme level, MCS level, based on at least one radio quality measurement. A further characterizing step is analyzing of buffer characteristics and/or radio block usage of transmission radio blocks to determine if there is a preferred MCS level compared to the recommended MCS level. The preferred MCS level is typically a more robust MCS level. The recommended MCS, level if so determined, is decreased to the preferred MCS level, and in relation to decreasing the MCS level decreasing the output power according to a predefined down regulation scheme. The interference level is reduced in the network depending on an application type.

15 Claims, 6 Drawing Sheets

METHOD FOR CONTROLLING OUTPUT POWER IN A RADIO COMMUNICATIONS NETWORK

TECHNICAL FIELD

The present invention relates to a method for controlling output power in a radio communications network, and more particular to a method for reducing interference in a radio communications network.

BACKGROUND

Voice over Internet Protocol (VoIP) is the transport of voice traffic using the Internet Protocol (IP). In the mobile world, VoIP means using a packet-switched (PS) service for transport of Internet Protocol (IP) packets which contain, e.g., Adaptive Multi-Rate (AMR) codec speech frames for voice mobile phone calls. A packet-switched connection is often simply referred to as a data connection.

In packet-switched networks, the message is broken into packets, each of which can take a different route to the destination where the packets are recompiled into the original message. The packet switched (PS) service utilized for VoIP can be, for example, GPRS (General Packet Radio Service), EDGE (Enhanced Data Rates for Global Evolution), or WCDMA (Wideband Code Division Multiple Access). Each of these example services happen to be built upon the Global System for Mobile communications (GSM), a second generation ("2G") digital radio access technology originally developed for Europe. GSM was enhanced in 2.5G to include technologies such as GPRS. The third generation (3G) comprises mobile telephone technologies covered by the International Telecommunications Union (ITU) IMT-2000 family. The Third Generation Partnership Project (3GPP) is a group of international standards bodies, operators, and vendors working toward standardizing WCDMA-based members of the IMT-2000.

EDGE (sometimes referred to as Enhanced GPRS (EGPRS)) is a 3G technology that delivers broadband-like data speeds to mobile devices. EDGE allows consumers to connect to the Internet and send and receive data, including digital images, web pages and photographs, three times faster than possible with an ordinary GSM/GPRS network. EDGE enables GSM operators to offer higher-speed mobile-data access, serve more mobile-data customers, and free up GSM network capacity to accommodate additional voice traffic. EDGE uses the same TDMA (Time Division Multiple Access) frame structure, logical channels, and 200 kHz carrier bandwidth as GSM networks, which allows existing cell plans to remain intact.

In EDGE technology, a base transceiver station (BTS) communicates with a mobile station (e.g., a cell phone, mobile terminal or the like, including computers such as laptops with mobile termination). The base transceiver station (BTS) typically has plural transceivers (TRX). A time division multiple access (TDMA) radio communication system like GSM, GPRS, and EDGE divides the time space into time slots on a particular radio frequency. Time slots are grouped into frames, with users being assigned one or more time slots. In packet-switched TDMA, even though one user might be assigned one or more time slots, other users may use the same time slot(s). So a time slot scheduler is needed to ensure that the time slots are allocated properly and efficiently.

EDGE offers nine different Modulation and Coding Schemes (MCSs): MCS 1 through MCS9. Lower coding schemes (e.g., MCS1-MCS2) deliver a more reliable but slower bit rate and are suitable for less optimal radio conditions. Higher coding schemes (e.g., MCS8-MCS9) deliver a much higher bit rate, but require better radio conditions. Link Quality Control (LQC) selects which MCS to use in each particular situation based on the current radio conditions.

In EDGE, the LQC selects a MCS for radio link control (RLC) data blocks for each temporary block flow (TBF). A TBF is a logical connection between a mobile station (MS) and a packet control unit (PCU). The PCU is usually (but not necessarily) located in the radio access network, e.g., in the base station controller (BSC). A TBF is used for either uplink or downlink transfer of GPRS packet data. The actual packet transfer is made on physical data radio channels (PDCHs). The bit rate for a TBF is thus effectively selected by selecting a MCS, and changing the MCS for a TBF changes its bit rate.

Adaptive Multi-rate (AMR) speech frames contain speech, typically 20 milliseconds of speech, encoded by an AMR codec. Voice encoder, vocoder, and codec are used interchangeably and refer to encoding speech/voice into a compressed digital format. An AMR codec supports unequal biterror detection and protection (UED/UEP). The UEP/UED mechanisms allow more efficient transmission of speech over a lossy network by sorting the bits into perceptually more and less sensitive classes. A frame is only declared damaged and not delivered if there are one or more bit errors found in the most sensitive bits. On the other hand, speech quality is still deemed acceptable if the speech frame is delivered with one or more bit errors in the less sensitive bits, based on human aural perception. In VoIP the AMR codec does not provide any redundancy for channel coding. The AMR codec only produces speech output and, instead, it is the EDGE coding schemes that are used for redundancy. EDGE can provide an error-free bearer with RLC acknowledged mode.

Another benefit of AMR is adaptive rate adaptation for switching smoothly between codec modes on-the-fly. A large number of AMR codec modes may be used with varying bit rates and resulting voice quality. An AMR codec may include multiple narrowband codec modes: 12.2, 10.2, 7.95, 7.4, 6.7, 5.9, 5.5 and 4.75 kbit/s. Even a wideband (WB) mode AMR WB at 12.65 kbit/s is available.

Traffic is increasing in GSM networks around the world and more and more networks are becoming interference limited. Hence, spectrum and interference levels are limiting factors for how much traffic that can be sent. One way to increase traffic in such a situation is to reduce the amount of energy needed per user which can e.g. be achieved by power control, improved receivers, more efficient coding or directing the energy using adaptive antennas.

Existing power control algorithms typically adapt an output power to a radio quality of a connection, and sometimes also in combination with a service/bearer (in UTRAN) which can be used. In situations where a coding scheme, and/or code selection, can be modified due to limited amount of data to transmit, then excessive power is used.

As an example in GPRS/EDGE data packets are queued in the PCU buffer before transferred over the air interface. Whenever the PCU buffer runs empty the last amount of data will be transmitted using a more robust MCS that can carry the remaining amount of data e.g. using for example MCS-5 instead of MCS-9, in the case when the LQC recommends a higher MCS than needed to fit the last amount of data into one radio block. Such a procedure is mentioned in the standard, 3GPP TS 44.060 V7.7.0 (2006-12) "Radio Link Control/Medium Access Control (RLC/MAC) protocol (Release 7)".

How often the PCU buffer runs empty during an ongoing session depends on the application type. Using excessive power has a negative impact on the system capacity and buffer under-runs happen all the time with VoIP conversations.

SUMMARY

An aspect of the present invention is to provide a method for controlling power usage and reducing interference in a radio communications network, which intends to avoid most of the problems mentioned above.

An advantage with the invention is that the interference level is reduced in the network.

In an embodiment of the present invention a method is described for controlling output power and reducing interference in a radio communications network wherein data transmitted over a radio interface is coded and transmitted in radio blocks. The data passes a buffer of a node before transmission. The method is characterized by a step of determining a recommended Modulation and Coding Scheme level, MCS level, based on at least one radio quality measurement. A further characterising step is, analyzing buffer characteristics and/or radio block usage of transmission radio blocks to determine if there is a preferred MCS level compared to the recommended MCS level. The preferred MCS level is typically a more robust MCS level. The recommended MCS, level if so determined, is decreased to the preferred MCS level, and in relation to decreasing the MCS level decreasing the output power according to a predefined down regulation scheme.

In another embodiment of the present invention there is described a network node having a control function for controlling output power to reduce interference in a radio communications network. Data transmitted over a radio interface, in the radio communications network, is coded and transmitted in radio blocks, the data passing a buffer in the network node. The network node is characterized by comprising a transceiver used for receiving radio quality measurements and for determining a recommended Modulation and Coding Scheme level, MCS level. The recommended MCS level is determined based on at least one radio downlink quality measurement. The network node further comprises analyzing software used for analyzing buffer characteristics and/or radio block usage of transmission radio blocks to determine if there is a preferred MCS level compared to the determined recommended MCS level. The preferred MCS level is typically a more robust MCS level. Thereafter, the analyzing software is able of decreasing the MCS level to the preferred MCS level, and in relation to decreasing the MCS level decreasing the output power according to a predefined down regulation scheme.

In another embodiment of the present invention there is described a mobile station having a control function for controlling output power to reduce interference in a radio communications network wherein data transmitted over a radio interface is coded and transmitted in radio blocks. The data transmitted is passing a buffer in the mobile station. The mobile station comprises a transceiver used for transmitting uplink radio data blocks and receiving information about a recommended Modulation and Coding Scheme level, MCS level, based on at least one radio uplink quality measurement. The mobile station further comprises analyzing software that is used for analyzing buffer characteristics and/or radio block usage of transmission radio blocks to determine if there is a preferred MCS level. The preferred MCS level is typically a more robust level compared to the determined recommended MCS level. Thereafter, the analyzing software is able of decreasing the MCS level to the preferred MCS level, and in relation to decreasing the MCS level decreasing the output power according to a predefined down regulation scheme.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. For example, it will be appreciated by those skilled in the art that block diagrams herein can represent conceptual views of illustrative circuitry embodying the principles of the technology.

Figure 1:
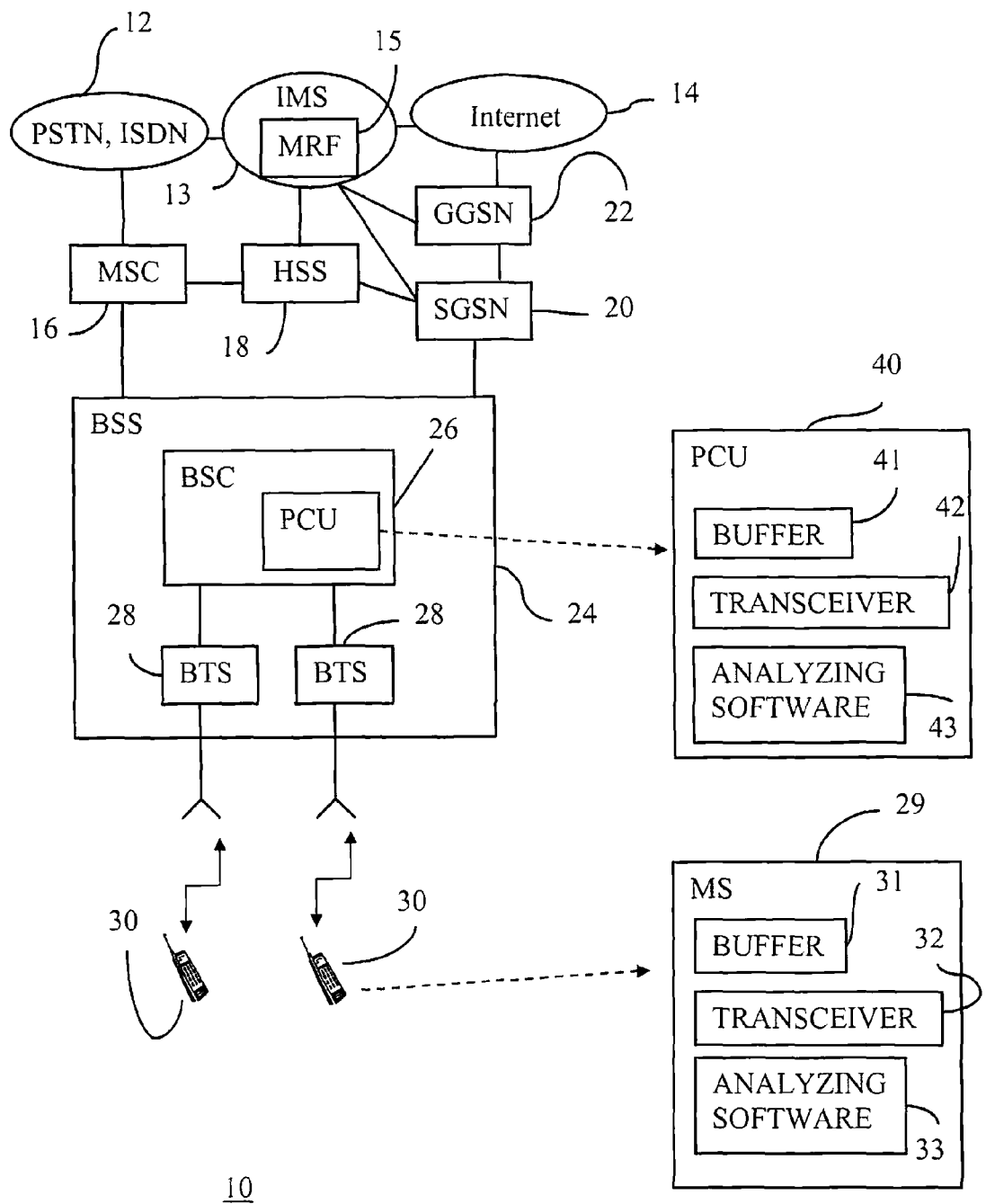
FIG. 1 is a block diagram illustrating an embodiment of the present invention.

FIG. 1 shows a mobile radio communications system 10 that couples to one or more circuit-switched networks 12 like the Public Switched Telephone Network (PSTN) and/or the Integrated Services Digital Network (ISDN), etc. via a mobile switching centre (MSC) 16 and to one or more packet-switched networks 14 like the Internet via a serving GPRS support node (SGSN) 20 and a gateway GPRS support node (GGSN) 22. The PSTN 12 and ISDN 14 are circuit switched core networks and the MSC core network node 16 supports circuit-switched services. The Internet is a packet-switched core network, and the SGSN 20 and GGSN 22 are packet-switched core network nodes. In addition to these core networks and associated core network nodes is an Internet Protocol Multimedia Subsystem (IMS) 13 which provides IP-based services, like VoIP, and multimedia services. The IMS 13 may include a media resource function (MRF) 15 to deliver media based services. The IMS is coupled to the core networks, to the GGSN 22, and the SGSN 20. The MSC 16, the IMS 13, and the SGSN 20 are coupled to a mobile subscriber database like a home subscriber server (HSS) 18 and to a radio access network.

In this non-limiting example, the radio access network is GSM-based and is referred to as a base station system (BSS) 24. The technology described here in this type of GSM-based/EDGE system may be applied to other type radio access networks. The BSS 24 includes one or more base station controllers (BSCs) 26 (only one is illustrated) coupled to plural base transceiver stations (BTSs) 28. The base station controller 26 controls radio resources and radio connectivity for the cells served by the BTSs 28 under its control. The BTSs 28 communicate with mobile radio stations (MSs) 30 using radio communications over an air interface. Each base transceiver station (BTS) 28 serves one or more cells. For each served cell, the base transceiver station 28 provides a pool of radio transmission resources (typically managed and allocated by the BSC) for communicating with mobile stations in that cell. Each base station (BTS) 28 includes a controller as well as radio transceivers and baseband processing circuitry to handle the radio transmission and reception within each served cell.

Each mobile station (MS) 30 includes a buffer 31, a radio transceiver 32, analyzing software 33 and data processing and control entities/functionalities, not shown in the figure, for providing Voice over Internet Protocol (VoIP) capability according to an embodiment of the invention. The person skilled in the art will recognize that the mobile station 30 and its data processing and control typically include numerous other functionalities and applications. The mobile station 30 also includes input/output devices such as a display screen, a keypad, a speaker, a microphone, and the like.

In EDGE, EGPRS, or GPRS, a first link layer protocol context, called a temporary block flow (TBF), is set up uplink from the mobile to the radio network, and a second TBF is set up downlink from the radio network to the mobile radio. A TBF can be viewed as a logical connection between a mobile station (MS) and a packet control unit (PCU) 40 in the network. While the PCU 40 may be located in a BSC 26, the PCU may also be located in a BTS 28, in an SGSN 20, etc. The PCU 40 comprises a buffer 41, a transceiver 42, analyzing software 43 and data processing and control entities/functionalities, not shown in the figure.

In general, the PCU performs LQC and can be located in the BSC, BTS, SGSN, etc. For ease of description only and not limitation, the PCU is assumed to be in the BSC. The BSC 26 in this non-limiting example selects a modulation and coding scheme MCS for the VoIP transmission for every 20 millisecond (msec) radio transmission block. Better radio conditions for the VoIP transmission means that more VoIP encoded bits can be included in each 20 msec radio block; hence, a higher modulation and coding scheme (MCS) is selected.

Figure 2:
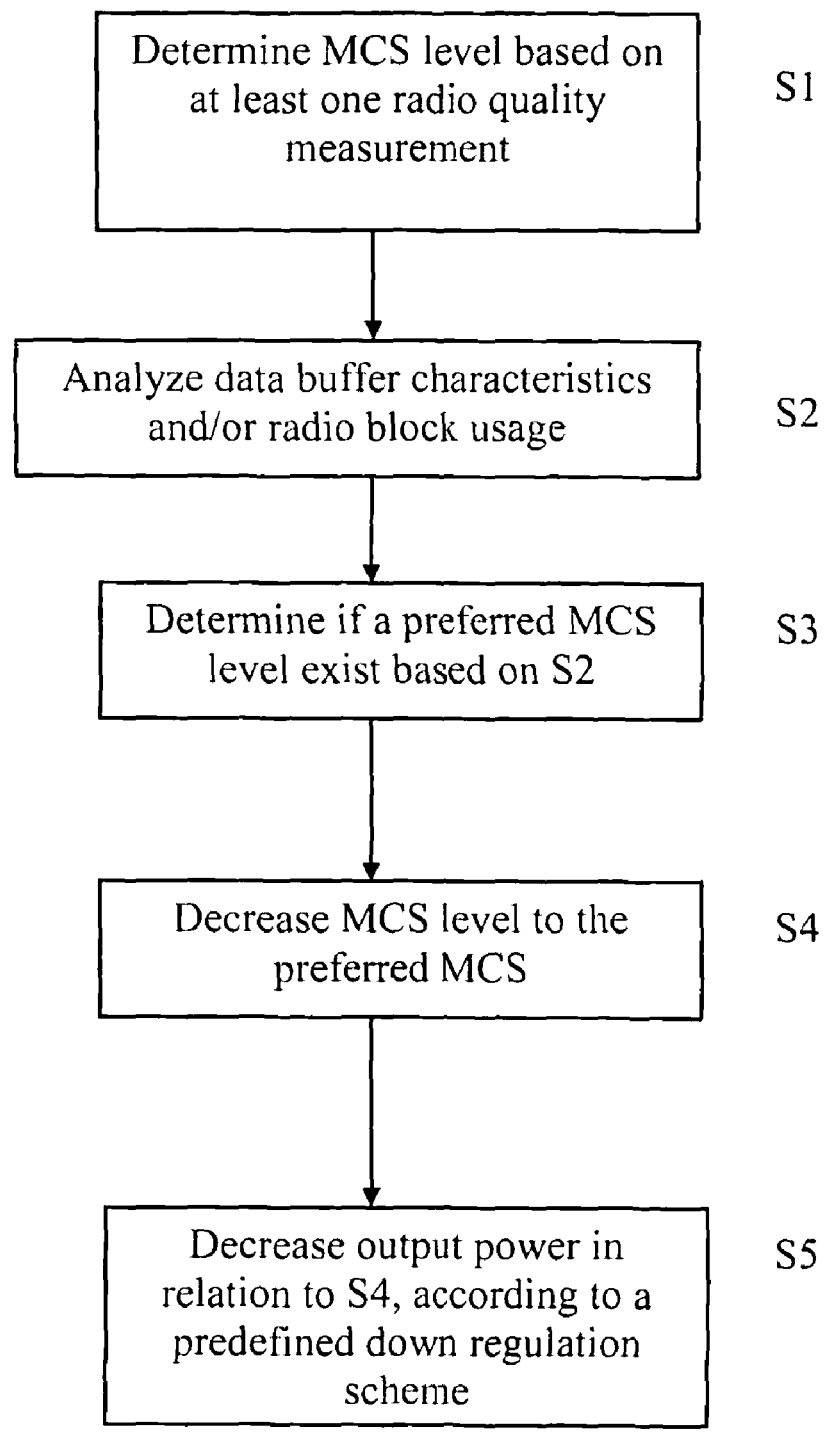
FIG. 2 is a flowchart illustrating embodiment of method steps.

FIG. 2 is a flowchart illustrating a method according to an embodiment of the present invention. The method is for controlling output power and reducing interference in a radio communications network where data is transmitted over a radio interface at least between two nodes of the radio communications network. In downlink the PCU 40 is considered to be the transmitting node and in uplink communication the mobile station 30 is considered to be the transmitting node. The data transmitted over the radio interface is coded and transmitted in radio blocks, the data passing a buffer (31, 41). A first step (S1) of the method is to determine a recommended Modulation and Coding Scheme level, MCS level, based on at least one radio quality measurement. For example, radio quality associated with a VoIP connection is such as Received Signal Strength Indication (RSSI), Signal to Interference Ratio (SIR), Carrier to Interference Ratio (CIR), Bit Error Rate (BER), block error/erasure rate (BLER) etc. A better radio quality results in a higher number (higher throughput but less robust) MCS being selected, and less favourable radio quality result in a lower number (lower throughput but more robust) MCS being selected. A second step (S2) is to analyze buffer characteristics and/or radio block usage of transmission radio blocks to determine (S3) if there is a preferred MCS level, typically more robust, compared to the recommended MCS level. If so, decrease (S4) the MCS level to the preferred MCS level, and in relation to decreasing the MCS level decrease (S5) the output power according to a predefined down regulation scheme. The Buffer characteristics analyzed relates to one or more of the following: usage; capacity; inflow; outflow; variations: and fill level. Analyzing radio block usage of transmission radio blocks refers to analyzing how much data that is to be sent in each radio block (Packet) that is the amount of data to be fitted in each transmission radio block or in the next radio block to be transmitted.

In an another embodiment of the present invention the preferred MCS and the decreased output power is used when transmitting a last amount of data from the buffer, and wherein the last amount of data still can be fitted into a radio block coded with a lower MCS level. Also, the recommended MCS level is decreased (S4) to the preferred MCS level in one or more steps and wherein the output power is decreased (S5) in relation to each decreasing step of the MCS level based on either a fix down regulation scheme and/or a dynamic down regulation scheme. Preferably, the down regulation is performed according to one or more standardized predefined matrixes guaranteeing that acceptable throughput and latency still is maintained.

In yet another embodiment of the present invention dynamic down regulation is performed in predefined steps per measurements period, the period is long enough to receive at a transmitting first network node feed-back information from a responding second network node. The response includes a recommended MCS. Then the down regulation continues until the response includes a recommended MCS level that is near to, a determined level step above, or equal to the preferred MCS level. The first node is preferably a PCU 40 and the second node is a mobile station 30. In yet a further embodiment of the present invention, in case the dynamic down regulation is initiated by the second network node, that is the mobile station 30, then in each predefined step, the down regulation can be communicated to the first network node, the PCU 40, according to a specific message or protocol, or as mentioned in the example of FIG. 5.

In another embodiment of the present invention the radio communications network is a GPRS/EDGE network and the communication is VoIP traffic and the described method is implemented in a Packet Control Unit node, PCU node, or in a Mobile Station, MS.

As results of reducing excessive power, radio frequency power absorbed by a human body positioned in a radio communications network is reduced as well as battery life time is increased and uplink interference is reduced by introducing a buffer and packet size power control procedure.

A general aspect of the present invention is to reduce excessive use of power, when there is only a limited amount of data to transmit, by applying a buffer characteristics and/or radio block usage power control method that adapts output power to a more robust coding scheme, or code selection. Thus, the method of the invention is very suitable for applications like VoIP with constant flow of short data packets and low bit rate.

Table 1 gives a non limiting example of how much the output power can be reduced when the preferred MCS is chosen instead of the recommended MCS. This example is only given for better explaining the invention and uplifting the benefits of output power down regulation.

TABLE 1

Example of fix down regulation for EGPRS depending on recommended and preferred MCS.

| | | Recommended MCS | | | | | | | | |
|---|---|---|---|---|---|---|---|---|---|---|
| | | 1 | 2 | 3 | 4 | 5 | 6 | 7 | 8 | 9 |
| Preferred MCS | 1 | — | 2 dB | 4 dB | 6 dB | 8 dB | 10 dB | 12 dB | 14 dB | 16 dB |
| | 2 | — | — | 2 dB | 4 dB | 6 dB | 8 dB | 10 dB | 12 dB | 14 dB |
| | 3 | — | — | — | 2 dB | 4 dB | 6 dB | 8 dB | 10 dB | 12 dB |
| | 4 | — | — | — | — | 2 dB | 4 dB | 6 dB | 8 dB | 10 dB |
| | 5 | — | — | — | — | — | 2 dB | 4 dB | 6 dB | 8 dB |
| | 6 | — | — | — | — | — | — | 2 dB | 4 dB | 6 dB |
| | 7 | — | — | — | — | — | — | — | 2 dB | 4 dB |
| | 8 | — | — | — | — | — | — | — | — | 2 dB |

Figure 3:
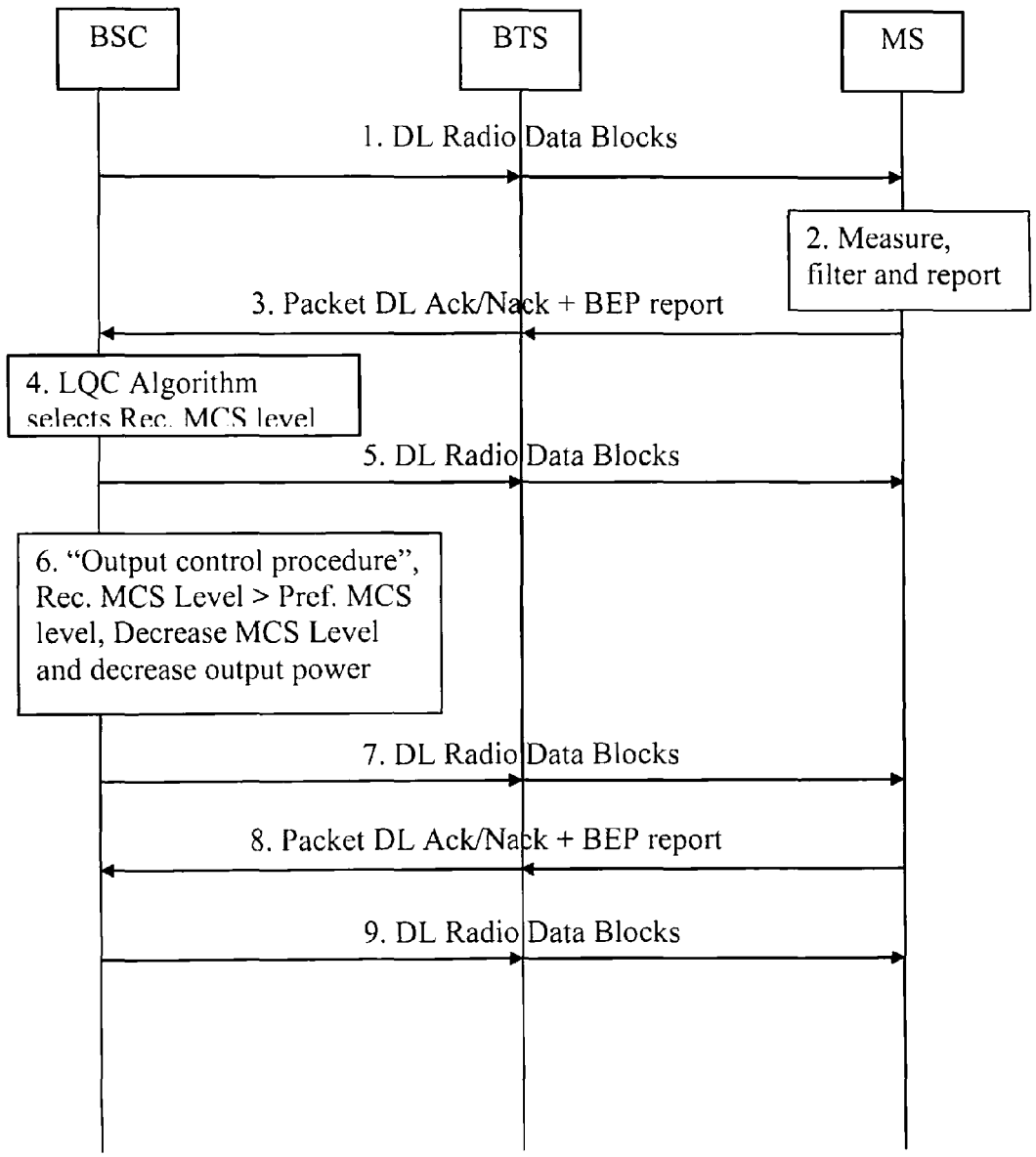
FIG. 3 is a signal diagram illustrating another embodiment of the present invention for downlink power control.

FIG. 3 is a signal diagram illustrating an embodiment of the present invention for downlink power control wherein the control unit PCU 40 is placed in the BSC, as an example. In this not limiting example the BSC 26 starts transmitting radio data blocks to a Mobile Station 30, via a BTS 28. The MS 30 then measures, filters and reports radio quality back to the BSC 26 via the BTS. The radio link is between the BTS 28 and the MS 30. The reports are typically, but not limited to, packet downlink Ack/Nack (acknowledge/not acknowledge) reports including bit error probability information. An LQC algorithm in the PCU 40 selects a recommended MCS level based upon the reports received from the MS 30 (BEP, BLER, and SIR Etc). More data blocks are there after sent to the MS 30 using the recommended MCS for modulating and coding the data blocks. At the same time analyzing software 43 starts an output control procedure by analyzing buffer characteristics and data block usage to determine if there is a preferred MCS level that can be used instead of the recommended MCS level. If the analyzing result in that there is a preferred MCS level then a decision is taken to decrease the MCS level and at the same time the output power is decreased according to a predetermined down regulation scheme. The down regulation scheme is a one step (fixed) down regulation or, as an alternative, a multiple step (dynamic) down regulation including or/and based on additional signalling, FIG. 5, between the mobile station 30 and the BSC 26. More data blocks are sent using the preferred MCS level and the decreased output power. The MS 30 continues reporting radio quality/conditions back to the PCU 40. Down regulation is performed according to a well tested predetermined scheme both fix and dynamic still guarantees LQC throughput and latency.

As an example, for GPRS/EDGE power reduction as mentioned above is made in accordance to a coding scheme back-off E.g. if radio quality corresponds to using MCS-9 and the last amount of data or certain applications suitable for such a reduction are sent with MCS-5 block, then output power can be reduced which has a huge potential for VoIP capacity in a network. The present invention according to FIG. 3 is described for GSM/EDGE but is also applicable to WCDMA with dynamic selection of transport format and power level or to other communication techniques as well.

Figure 4:
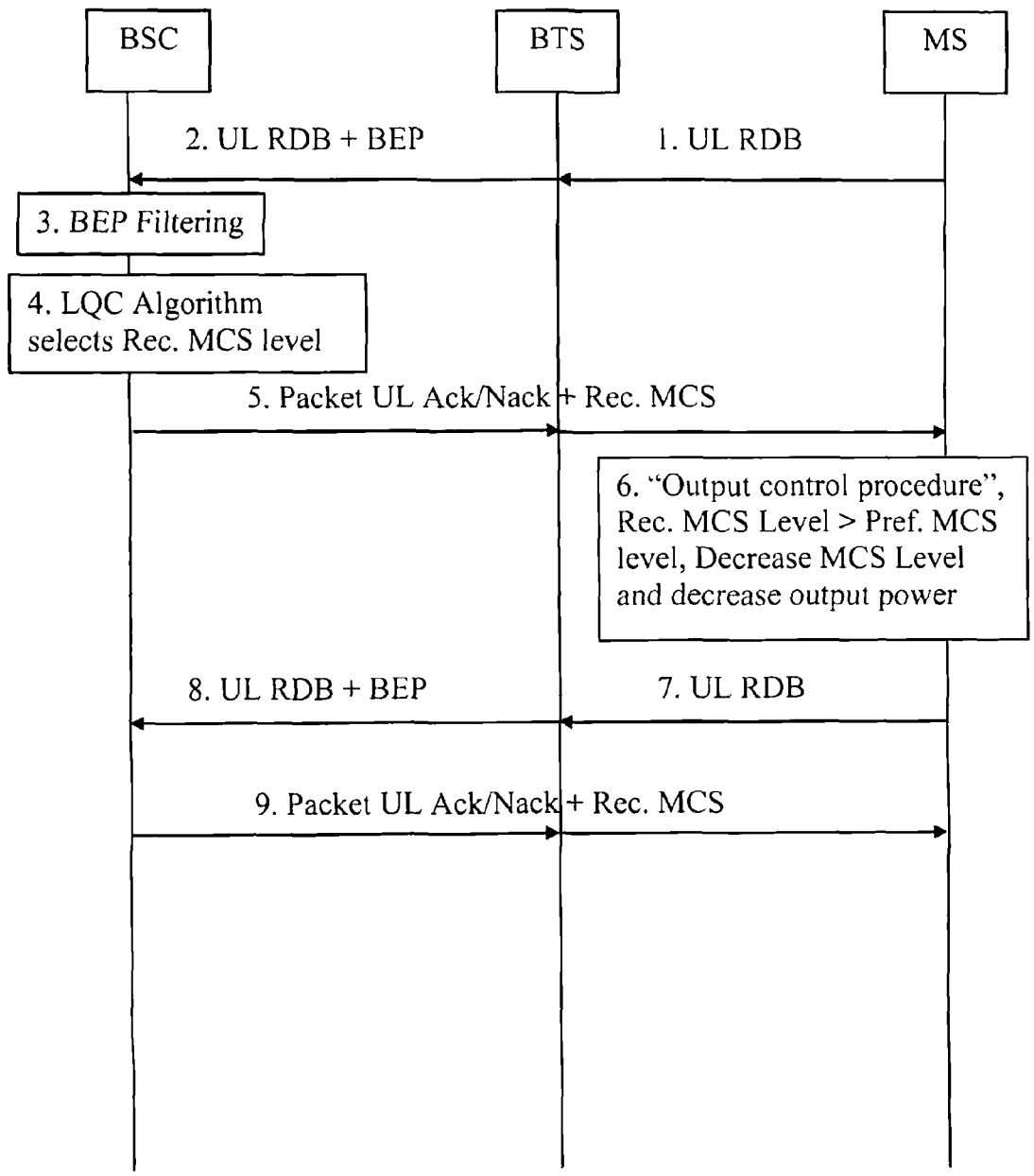
FIG. 4 is a signal diagram illustrating another embodiment of the present invention for uplink power control.

FIG. 4 is a signal diagram illustrating another embodiment of the present invention for uplink power control wherein the control unit PCU 40 is placed in the BSC, as an example. In this not limiting example the MS 30 starts sending radio blocks uplink to the BSC 26 via a BTS 28. The BTS ads radio quality information to the radio blocks before forwarding them to the BSC 26. The PCU 40 in this example placed in the BSC 26 performs BEP filtering, among other filtering steps, to determine radio quality. The PCU 40 then determines a recommended MCS level based on measured radio quality reports. Typically a LQC algorithm is used to determine the recommended MCS level. The PCU 40 then sends data block, or packet, uplink ack/nack together with the recommended MCS level to be used to the MS 30. The MS 30 receives the recommended MCS level from the PCU 40 and starts using this level when transmitting radio data blocks. At the same time analyzing software 33 starts an output control procedure at the MS 30 by analyzing buffer characteristics and data block usage to determine if there is a preferred MCS level that can be used instead of the recommended MCS level. If the analyzing result in that there is a preferred MCS level then a decision is taken to decrease the MCS level and at the same time the output power is decreased according to a predetermined down regulation scheme. The down regulation scheme is a one step (fixed) down regulation or, as an alternative, a multiple step (dynamic) down regulation including or/and based on additional signalling, FIG. 5, between the mobile station 30 and the BSC 26. More data blocks are sent using the preferred MCS level and the decreased output power. The PCU 40 continues controlling radio quality/conditions. Down regulation is performed according to a well tested predetermined scheme both fix and dynamic still guarantees LQC throughput and latency.

As an example of dynamic down regulation the MS determining the existence of a preferred MCS level starts a output back-off power procedure performed in steps of 2 dB per RLC/MAC RTT measurement period (Radio Link Control/Media Access Control). This back-off procedure continues until the PCU 40 returns a recommended MCS level equal to the preferred MCS level. Then to guarantee that throughput and latency is maintained a step up (increase) of output power with 2 dB per RLC/MAC RTT is performed. Alternatively, no step up is needed and output power is remained at the latest level. In case the PCU returns a recommended MCS level lower than the preferred MCS level, which should not happen, then an increase of output power/effect is commanded.

Figure 5:
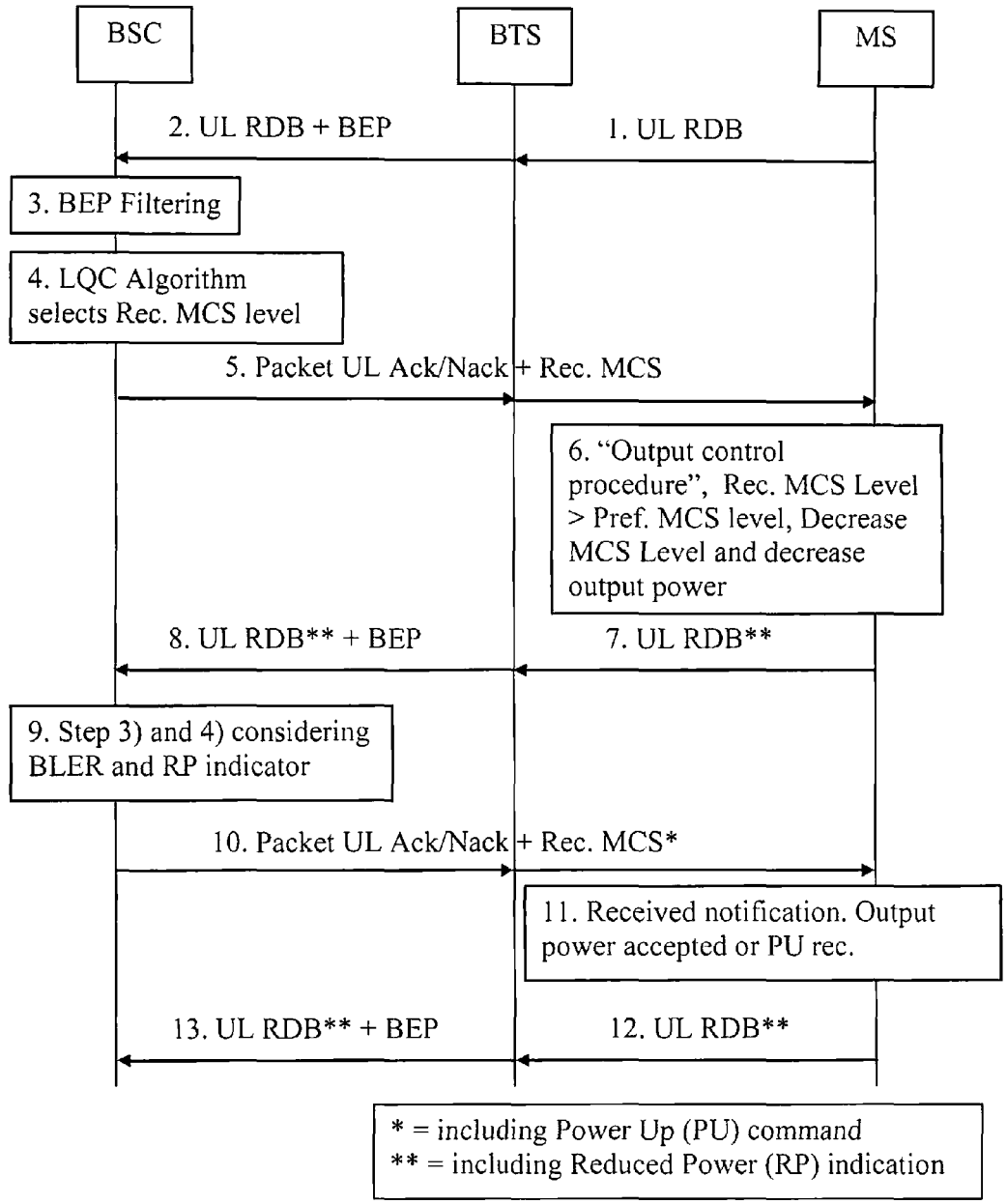
FIG. 5 is a signal diagram illustrating an embodiment of the present invention for pre-signalled uplink power control.

FIG. 5 is a signal diagram illustrating an embodiment of the present invention for pre-signalled uplink power control similar to the procedure of FIG. 4 mentioned above. A difference here is that the mobile station 30 signals/informs the PCU 40 that the output power is decreased. This information is sent as separate message or included in the uplink radio block as a reduced power indication. The PCU 40 then determines if the output power reduction is accepted, and in case not, returning a power up command to the MS 30, as a notification to be received by the MS 30. The power up command sent from the PCU to the MS is set typically based on radio quality measurements; MCS used; and on the reduced power indication.

Figure 6:
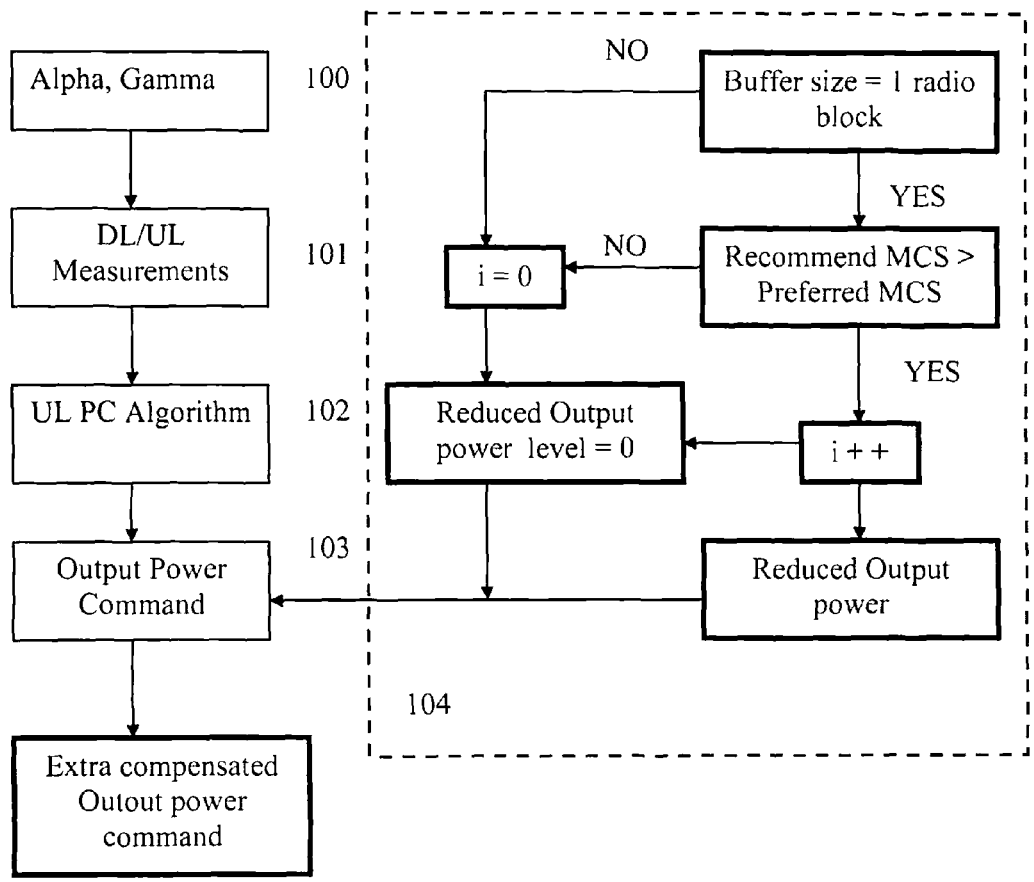
FIG. 6 is a flow chart illustrating an example of down regulation of output power according to an embodiment off the present invention.

FIG. 6 is a flow chart according to an embodiment off the present invention illustrating down regulation of output power based on analyzed buffer level as an example. For UL the network, the PCU in the network, also controls the output power for UL GPRS/EDGE radio blocks. This is performed by using parameters called ALPHA and GAMMA. GAMMA is a cell parameter for GPRS Dynamic MS Power Control. It is set to give desired received signal strength at the BTS. ALPHA is a BSC parameter for GPRS Dynamic MS Power Control. It is set between zero and ten but the setting corresponds to a decimal value (0.0, 0.1 . . . 1). Alpha is used to decide the level of reduction of the MS output power in relation to the path loss. ALPHA can be broadcast in system information. signalled in packet assignment messages and be updated in packet UL ack/nack messages. GAMMA can be signalled in packet assignment messages and be updated in packet UL ack/nack messages. Both parameters can also be sent to the MS in a "Packet Power Control/Timing Advance" message. Based upon these parameters (100) the MS calculates the UL power according to known standards; see for example 3GPP TS 45.008 (chapter 10.2.1). According to an embodiment of the invention in this example there is described a method for adapting the power to the buffer level and packet size wherein the method can e.g. be applied in combination with or after the legacy power procedure (102). In step (101) DL measurements are performed and as a following step (102) a rough regulation of the output power is performed that is for example an output power suitable for a recommended MCS9. As an example if a mobile is very close to a BTS and the MS is measuring very high signal strength on a broadcast channel (BCCH), then alpha and gamma is used to estimate an output power that is to be used in UL for the communication. In step (104) the output power is further regulated based on analyzed buffer level, recommended MCS, preferred MCS and used radio blocks. Additionally, the down regulation can be fixed or dynamic and the regulation might be based on additional analyzing steps which preferably are added to the method. Such analyzing steps are for example: analyzing buffer inflow; analyzing buffer outflow; analyzing buffer variations; and buffer usage.

It will be understood by those skilled in the art that various modifications and changes may be made to the present invention without departure from the scope thereof, which is defined by the appended claims.

The invention claimed is:

1. A method for controlling output power and reducing interference in a radio communications network, where data transmitted over a radio interface is coded and transmitted in radio blocks, the data passing a buffer, and where the method comprises:
   determining a recommended Modulation and Coding Scheme level (MCS level), based on at least one radio quality measurement;
   analyzing buffer characteristics and/or radio block usage of transmission radio blocks to determine if there is a preferred MCS level compared to the recommended MCS level; and
   decreasing, when there is a preferred MCS level, the recommended MCS level to the preferred MCS level, and in relation to decreasing the MCS level decreasing an output power according to a predefined down regulation scheme;
   wherein the predefined down regulation scheme is performed in predefined steps per measurement period,
   wherein the measurement period is long enough to receive, at a transmitting first network node, feed-back information from a responding second network node, the response including the recommended MCS level, and
   continuing the predefined down regulation scheme until the response includes a recommended MCS level that is equal to the preferred MCS level.

2. The method of claim 1 where the preferred MCS and the decreased output power is used when transmitting a last amount of data from the buffer, and
   where the last amount of data is capable of fitting into a radio block coded with a lower MCS level.

3. The method of claim 1 where the recommended MCS level is decreased to the preferred MCS level in one or more steps, and
   where the output power is decreased in relation to each decreasing step of the MCS level.

4. The method of claim 1 where the predefined down regulation scheme is performed according to one or more standardized predefined matrixes guaranteeing that acceptable throughput and latency are maintained.

5. The method of claim 1 where the predefined down regulation scheme, when being initiated by the second network node, then in each predefined step, the down regulation is communicated to the first network node by signalling or according to a specific message or protocol.

6. A network node having a control function for controlling output power to reduce interference in a radio communications network, where data transmitted over a radio interface is coded and transmitted in radio blocks, the data passing a buffer in the network node, and where the network node comprises:
   a transceiver to:
      receive radio quality measurements, and
      determine a recommended Modulation and Coding Scheme level (MCS) level, based on at least one radio downlink quality measurement; and
   an analyzer to:
      analyze buffer characteristics and/or radio block usage of transmission radio blocks to determine if there is a preferred MCS level compared to the determined recommended MCS level,
      decrease, when there is a preferred MCS level, the recommended MCS level to the preferred MCS level,
      in relation to decreasing the MCS level, decrease an output power according to a predefined down regulation scheme,
   wherein the predefined down regulation scheme is performed in predefined steps per measurement period,
   wherein the measurement period is long enough to receive, at a transmitting first network node, feed-back information from a responding second network node, the response including the recommended MCS, and
   wherein the analyzer is further to:
      continue the predefined down regulation scheme until the response includes a recommended MCS level that is equal to the preferred MCS level.

7. The network node of claim 6 where the preferred MCS and the decreased output power is used when transmitting a last amount of data from the buffer, and
   where the last amount of data is capable of fitting into a radio block coded with a lower MCS level.

8. The network node of claim 6 where the recommended MCS level is decreased to the preferred MCS level in one or more steps, and
   where the output power is decreased in relation to each decreasing step of the MCS level.

9. The network node of claim 6 where the predefined down regulation scheme is performed according to a standardized predefined matrix guaranteeing that acceptable throughput and latency still are maintained.

10. The network node of claim 6 where the network node is able to send power up commands when receiving a reduced power indication from another network node initiating a power down regulation.

11. A mobile station having a control function for controlling output power to reduce interference in a radio communications network where data transmitted over a radio interface is coded and transmitted in radio blocks, the data passing a buffer in the mobile station, and where the mobile station comprises:

a transceiver to:
transmit uplink radio data blocks, and
receive information about a recommended Modulation and Coding Scheme level (MCS) level, based on at least one radio uplink quality measurement; and an analyzer to:
analyze buffer characteristics and/or radio block usage of transmission radio blocks to determine if there is a preferred MCS level compared to the determined recommended MCS level,
decrease, when there is a preferred MCS level, the recommended MCS level to the preferred MCS level,
in relation to decreasing the MCS level, decrease an output power according to a predefined down regulation scheme,
wherein the predefined down regulation scheme is performed in predefined steps per measurement period,
wherein the measurement period is long enough to receive, at a transmitting first network node, feedback information from a responding second network node, the response including the recommended MCS, and
wherein the analyzer is further to:
continue the fix down regulation scheme until the response includes a recommended MCS level that is equal to the preferred MCS level.

12. The mobile station of claim 11 where the preferred MCS and the decreased output power is used when transmitting a last amount of data from the buffer, and
where the last amount of data is capable of fitting into a radio block coded with a lower MCS level.

13. The mobile station of claim 11 where the recommended MCS level is decreased to the preferred MCS level in one or more steps, and
where the output power is decreased in relation to each decreasing step of the MCS level.

14. The mobile station of claim 11 where the predefined down regulation scheme is performed according to a standardized predefined matrix guaranteeing that acceptable throughput and latency still are maintained.

15. The mobile station of 11 where the predefined down regulation scheme, in each predefined step, is communicated from the mobile station to a network node by signalling or according to a specific message or protocol.

* * * * *

UNITED STATES PATENT AND TRADEMARK OFFICE
CERTIFICATE OF CORRECTION

PATENT NO. : 8,140,105 B2
APPLICATION NO. : 12/532787
DATED : March 20, 2012
INVENTOR(S) : Björkén et al.

It is certified that error appears in the above-identified patent and that said Letters Patent is hereby corrected as shown below:

On the Cover Page, item (75), under "Inventors", in Column 1, Line 1,
delete "Bjorken," and insert -- Björkén, --, therefor.

On the Cover Page, item (57), under "ABSTRACT", in Column 2, Line 13,
delete "MCS, level" and insert -- MCS level, --, therefor.

In Column 3, Lines 48-51, delete "MCS level.........regulation scheme." and
insert the same at Line 47, after "more robust", as a continuation paragraph.

In Column 9, Line 12, delete "information." and insert -- information, --, therefor.

In Column 12, Line 24, in Claim 15, delete "of 11" and insert -- of claim 11 --, therefor.

Signed and Sealed this
Fourteenth Day of August, 2012

David J. Kappos
*Director of the United States Patent and Trademark Office*